United States Patent

[11] 3,609,022

| [72] | Inventors | Morris Schwartz;<br>Conkling Chedister; Frank H. Beckman, all of Plainville, Conn. |
|---|---|---|
| [21] | Appl. No. | 842,618 |
| [22] | Filed | July 17, 1969 |
| [45] | Patented | Sept. 28, 1971 |
| [73] | Assignee | The Kalart Company Inc.<br>Plainville, Conn. |

[54] MOTION PICTURE FILM PROJECTOR
17 Claims, 17 Drawing Figs.

[52] U.S. Cl. ............................................. 352/158,
226/91, 352/1, 352/124, 352/139, 352/159,
352/169
[51] Int. Cl. .................................................... G03b 1/58
[50] Field of Search ........................................ 352/158,
159, 169; 226/91

[56] References Cited
UNITED STATES PATENTS

| 2,472,143 | 6/1949 | Briskin | 352/158 |
| 3,089,628 | 5/1963 | Rookus | 352/158 X |
| 3,426,950 | 2/1969 | Maurer, Jr. | 352/158 X |
| 3,490,837 | 1/1970 | Peirez et al. | 352/159 |
| 3,493,297 | 2/1970 | McKee | 352/159 X |

*Primary Examiner*—Louis R. Prince
*Assistant Examiner*—Joseph W. Roskos
*Attorney*—Hane & Baxley

ABSTRACT: A motion picture film projector, particularly a sound film projector, has an automatic film-threading mechanism with which threading and loop setting are effected by first dropping the film to be threaded into a loading slot formed in the casing of the projector and then moving an operating lever from a film-loading position into the operating position. As a result of such movement the threading mechanism is activated to thread the film upon the upper and lower sprockets, to form upper and lower loops and to move the lens system into position for projection. Removal of the film is effected by simply returning the operating lever to its loading position thereby freeing the film from its engagement with the components of the threading mechanism so that the film can be lifted out of the slot.

INVENTORS
MORRIS SCHWARTZ
CONKLING CHEDISTER
FRANK H. BECKMAN

BY Hane and Bagley

ATTORNEYS

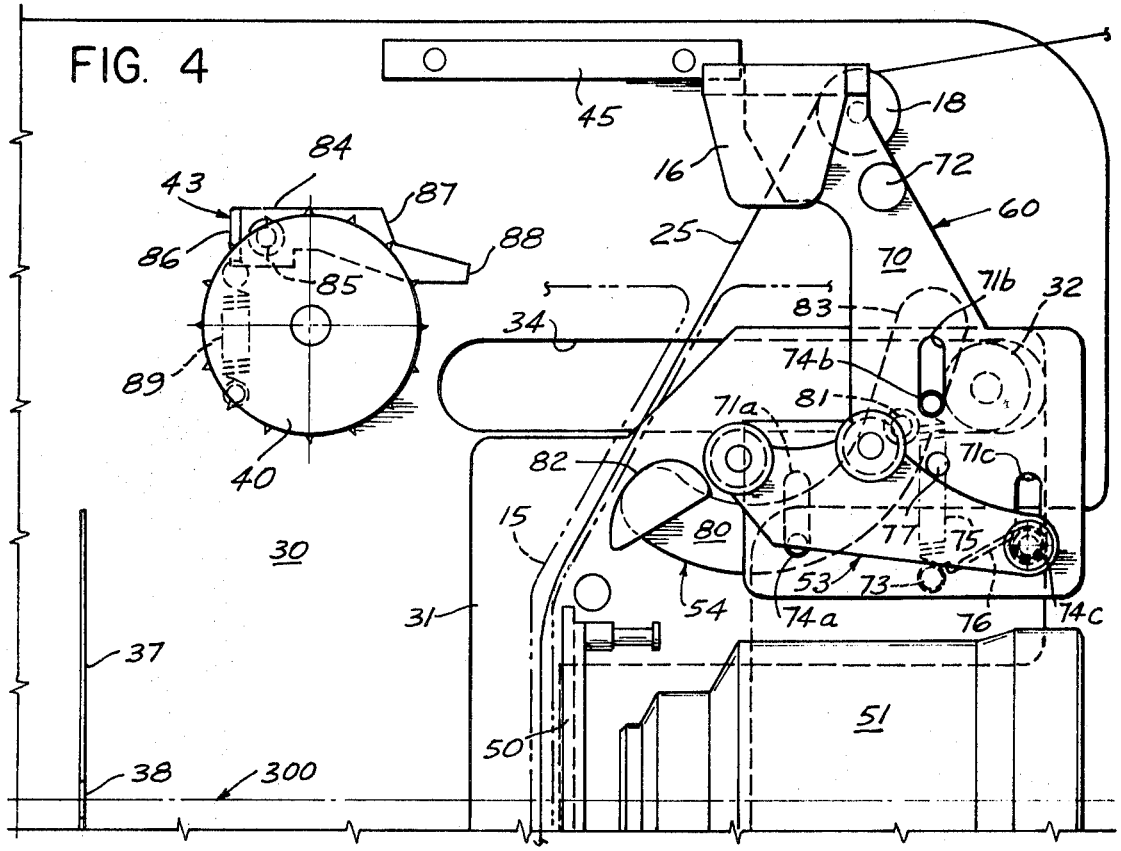

INVENTORS
MORRIS SCHWARTZ
CONKLING CHEDISTER
FRANK H. BECKMAN
BY Hane and Bailey
ATTORNEYS

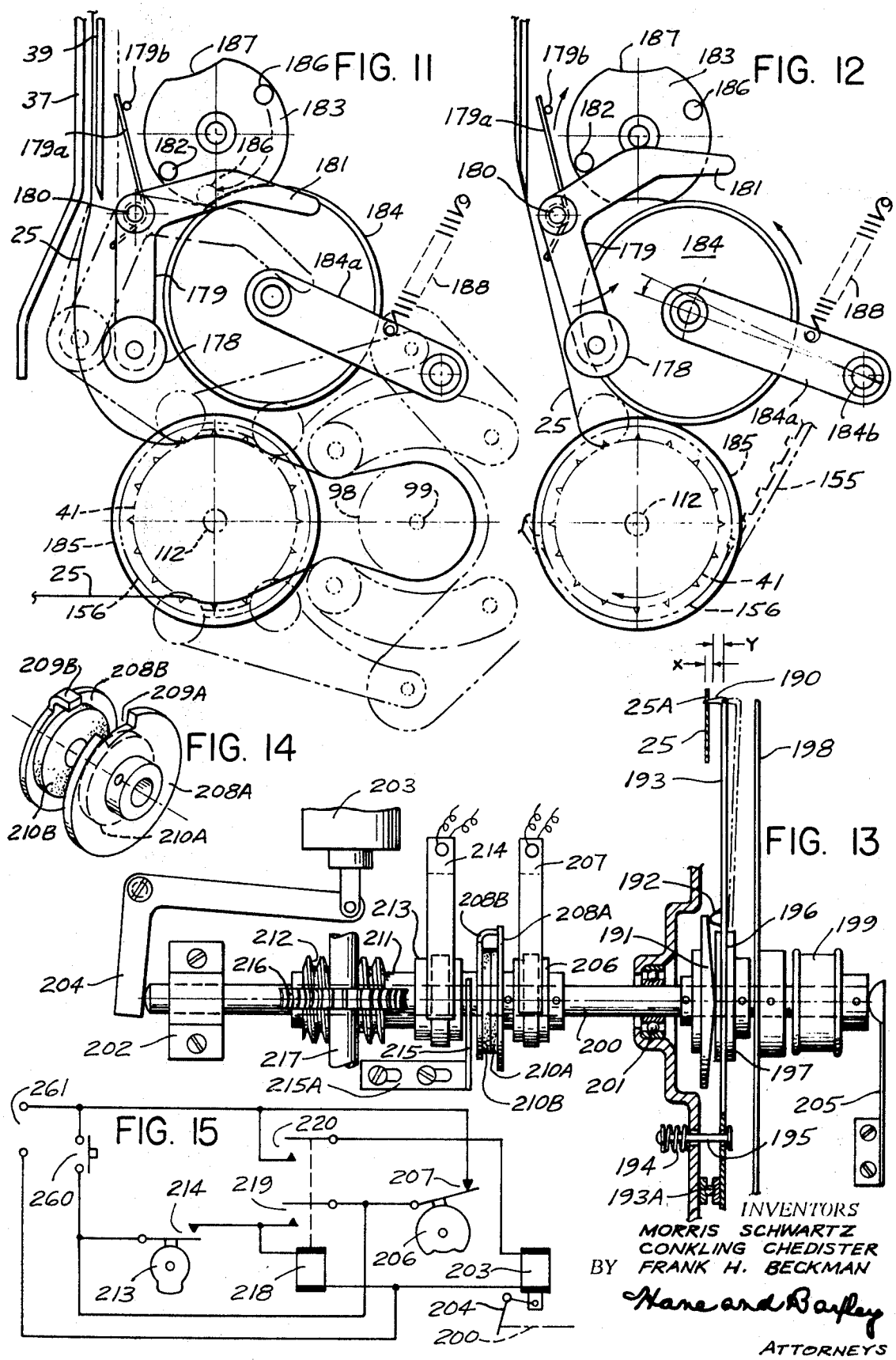

MOTION PICTURE FILM PROJECTOR

The present invention relates to motion picture film projectors, either silent film projectors or sound film projectors, and more particularly to a film-threading mechanism for such projectors.

BACKGROUND

With projectors as they are now widely used in the audiovisual field for teaching and training purposes and also for showing home movies, one of the most frequently recurring problems is the threading of the film and the removal of the film from the projector. Operators of projectors used in the above indicated areas and related areas are more often than not amateurs, or at least not specifically skilled in the operation of the projector.

Many proposals have been made to simplify the threading and the removal of the film. However, even the most simplified threading mechanism as now known still requires accurate threading of the film on sprockets and loop forming by the operator. These operations are difficult for less expert users of the projectors.

THE INVENTION

It is a broad object of the invention to provide a novel and improved threading mechanism for a projector of the general kind above referred to which reduces the skill demanded of the operator to an absolute minimum by automatically performing all required threading and loop-forming functions.

A more specific object of the invention is to provide a novel and improved threading mechanism which merely requires that the operator inserts a suitable length of film into a loading slot and then shifts an operating lever from a loading position to an operating position, and which permits an equally simple removal of the film by returning the lever into its loading position and withdrawal of the film from the loading slot by lifting the film out of the slot.

Another more specific object of the invention is to provide a novel and improved threading mechanism which includes a loading slot that is clear of obstructions by components of the threading mechanism so that the film can be inserted into the loading slot by simply dropping the film into the same without particular care on the part of the operator.

Still another object of the invention is to provide a novel and improved threading mechanism which automatically restores the loops in the film when due to a faulty film, for instance a film having torn sprocket holes, the film tightens during operation between the upper and lower sprockets of the projector.

A further object of the invention is to provide a novel and improved threading mechanism which permits, if desired, a high-speed rewind without compromising in any way the aforedescribed simplicity of the film threading and removing operations.

A still further object is to provide a novel and improved threading mechanism which permits stopping of the film at any desired moment to inspect the frame then in the film gate of the projector.

SUMMARY OF THE INVENTION

The afore pointed out objects, features and advantages and other objects, features and advantages which will be pointed out hereinafter are obtained by providing in a suitable wall of the projector casing, such as the front panel, a continuous slot for loading the projector with the film to be threaded by dropping a length of film into the slot. The upper and lower sprockets are stationarily mounted on a fixed baseplate within the projector on one side of the slot therein while threading and loop-setting components of the mechanism are mounted on a plate which is slidable within the projector with reference to the slot and the stationarily mounted components of the mechanism. The movable plate is displaceable by means of an operating lever from a loading position in which all the components supported on this plate are disengaged from the sprockets into an operating position. Such movement of the movable plate causes movement of the threading and loop-setting components supported by the movable plate to effect threading of the film upon the sprockets and to form the upper and lower loops between the sprockets. Movement of the movable plate into the operating position also causes movement of the projection lens system into the projection position. Removal of the film is effected by returning the operating lever to the loading position, thereby freeing the film so that it can be lifted out of the slot.

In the accompanying drawing several preferred embodiments of the invention are shown by way of illustration and not by way of limitation.

In the drawing:

FIG. 4 is a detailed elevational view of the mechanism as located above the optical center line of the projector, the mechanism being shown in its nonoperating or loading position;

FIG. 5 is a view similar to FIG. 4, but showing the mechanism in its operating position except for the steps effected by releasing the operating lever of the mechanism;

FIG. 11 is an elevational view of another modification of the loop-setting assembly;

FIG. 12 is an elevational simplified view of the assembly according to FIG. 11, but showing the same in another operational position;

FIG. 13 is a diagrammatic view of an assembly for stopping the film to position a frame of the film in alignment with respect to the film gate of the projector;

FIG. 14 is a perspective detailed view of components of the assembly according to FIG. 13;

FIG. 15 is a diagrammatic circuit diagram for the assembly according to FIG. 13;

The optical system, the sound system, and the reel mounting of the projector should be visualized as being conventional. These and other standard components of the projector do not constitute part of the invention and are hence not illustrated or described in detail.

Figure 1:
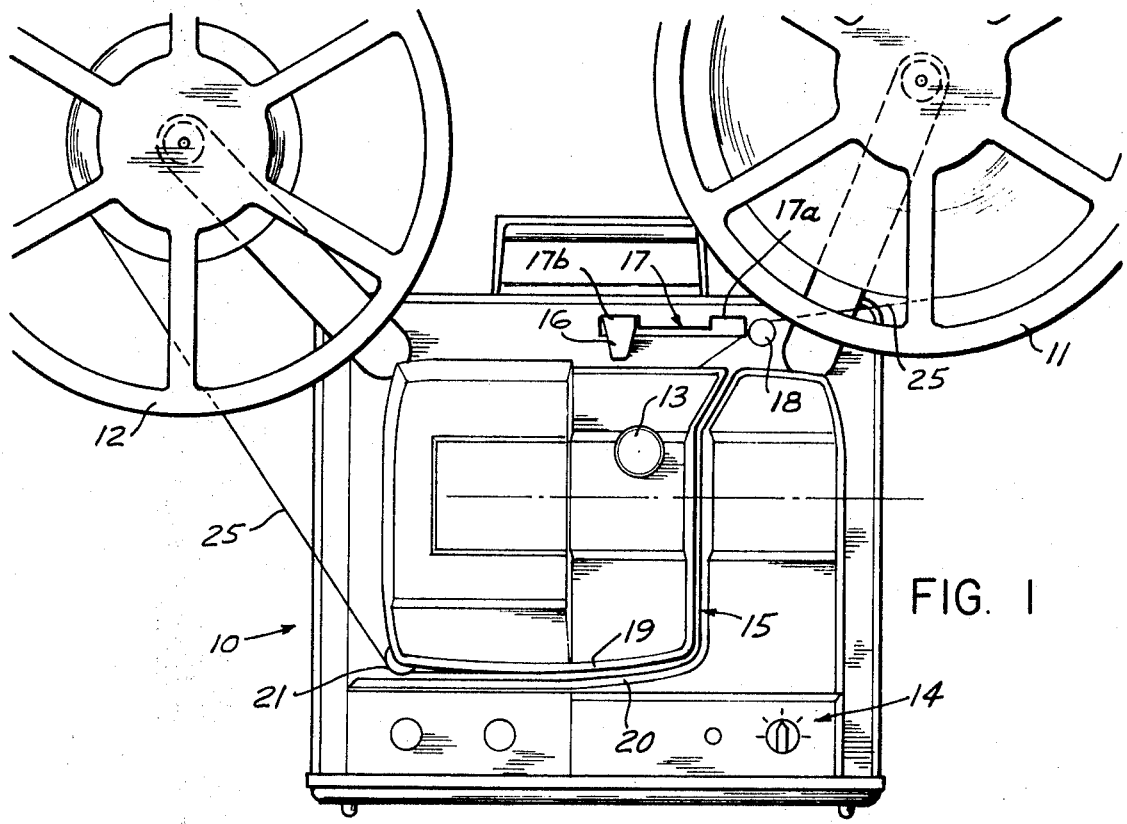
FIG. 1 is a diagrammatic elevational view of a sound film projector in its operating position.

Referring now to the figures in detail, there is shown in FIG. 1 a projector 10 which mounts protruding therefrom in conventional fashion a supply reel 11 and a takeup reel 12. There is also shown a focusing knob 13 and a control panel 14 mounting the usual knobs for controlling the projection light, the motor and the sound of the projector.

The front panel of the projector further shows a continuous curved slot 15 for inserting a sound film 25 to be threaded. The edges of the slot are preferably ornamentally and functionally bevelled as it is indicated at 19 and 20. The slot is open and free of obstructions for inserting a film into the slot.

As will be more fully explained hereinafter, all the movable components of the projector mechanism are to the right of slot 15 and clear of the same. Threading of a film as far as the operator is concerned is effected by simply withdrawing from the supply reel a sufficient length of film to permit slipping of the film into the slot, taking care only that the film is guided over guide roller 18 associated with supply reel 11 and over guide roller 21 associated with takeup reel 12, and by moving an operating lever 16 from the right-hand position into the left-hand position shown in FIG. 1. Such movement of the lever will automatically cause complete threading of the film, and also loop setting, as will be more fully explained hereinafter.

Lever 16 is slidable in a slot 17 terminating at its ends in L-cutouts 17a and 17b to retain the lever in its limit positions. As indicated before, position 17a constitutes the loading position of the projector and position 17b the operating position.

Figure 2:
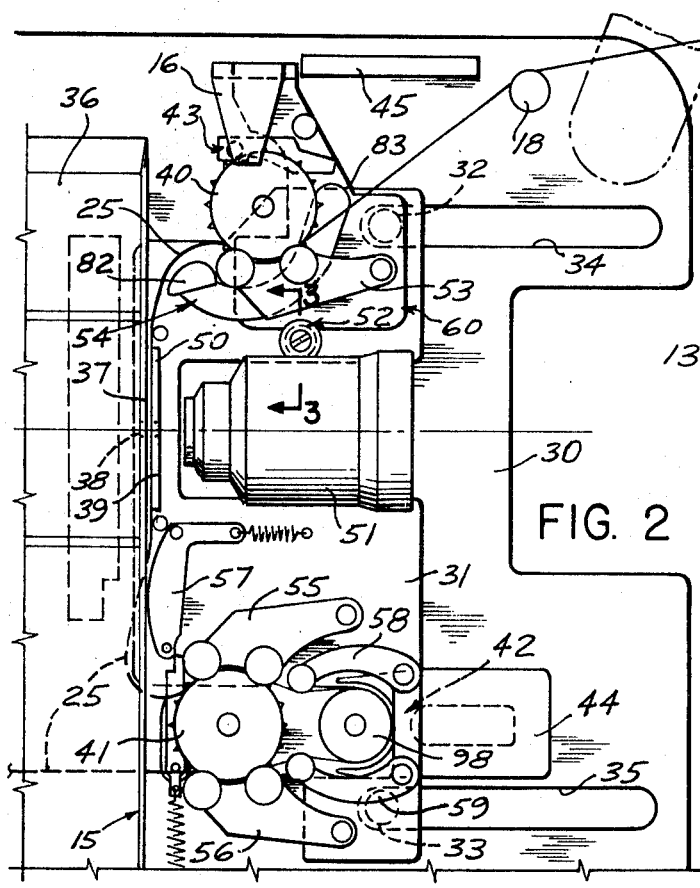
FIG. 2 is a fragmentary elevational view of FIG. 1, the front cover of the projector having been removed to show diagrammatically the mechanism thereof.

Referring now to FIG. 2 which shows the projector with the film threaded therein, that is, in its position ready for operation (lever 16 is in its left-hand position), the mechanism comprises a fixed or stationary assembly and a movable assembly.

The stationary assembly, the components of which will be described hereinafter, is mounted on a baseplate 30 and the movable assembly is mounted on a plate 31, which is slidable relative to plate 30 parallel thereto. Plate 31 is guided on plate 30 by means of guide rollers 32 and 33 mounted on plate 31 and engaging guide slots 34 and 35 respectively, in plate 30. Other suitable means or additional means for guiding the movable assembly to prevent jamming thereof relative to the baseplate may of course be provided, but are not shown to simplify the illustration and as not constituting an essential part of the invention.

Baseplate 30 is mounted operationally fixed with reference to the optical system of the projector, diagrammatically indicated by an enclosure 36, which should be visualized as containing among other components, a lamp, appropriate lenses, a condenser or heat shield and a shutter. There is also shown a fixed rear film guide 37 to the left of the slot 15, a film gate 38 and a film transport claw 39, the movements of which are conventional and diagrammatically indicated in FIG. 6. Baseplate 30 mounts to the right of the slot an upper sprocket 40, a lower sprocket 41, a sound-scanning system 42 of conventional design, an upper loop setting lever 43, a double-cam plate 44, and a bar 45 disposed behind slot 17. The bar is an optional safety element to assure positive control of the locking and the movement of lever 16 instead of merely relaying on the configuration of slot 17 as previously described.

Slidable plate 31 mounts a front film guide 50 including a film aperture or gate, a projection lens system 51, a focusing assembly 52 (see FIG. 3), an upper film guide 53, an upper loop setting member 54, lower film guides 55 and 56, a lower loop setting member 57, idler filter rollers 58 and 59 and an assembly 60 which is slidable up and down with reference to plate 31 and is actuated by lever 16 by being secured thereto.

Figure 3:
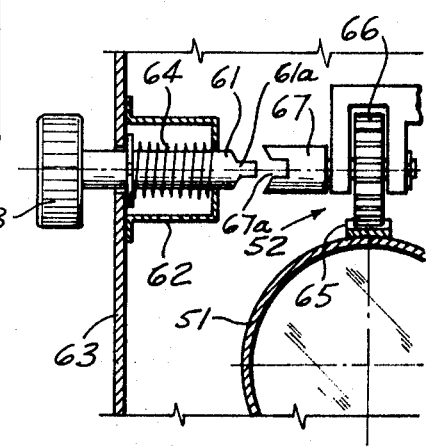
FIG. 3 is a section taken on line 3—3 of FIG. 2 on an enlarged scale.

Referring to FIG. 3, focusing knob 13 is mounted on a shaft 61 lengthwise slidable in a bracket 62 which may be visualized as being secured to a suitable wall such as a cover wall 63 of the projector. Shaft 61 is biased by a spring 64 and terminates in a nose 61a engageable with a slot 67a of a shaft 67 mounting a pinion 66 coacting with a rack 65 mounted on a barrel of the projection lens system 51.

As is evident from FIG. 3, the lens system can be focused by pressing in knob 13 and turning the same. The retraction of the knob by springs 64 when released avoids accidental disturbance of the set focus.

Referring now to FIGS. 4 and 5, the afore referred to up and down slidable assembly 60 comprises a plate 70 including one or more guide slots, guide slots 71a, 71b and 71c being shown. Plate 70 mounts studs 72 and 73 and also operating lever 16. The slots engage studs 74a, 74b and 74c mounted on plate 31 to guide plate 70 relative to plate 31. A tension spring 75 secured to stud 73 on plate 70 and to stud 74b on plate 31 biases plate 70 and thus the entire assembly 60 upwardly. Stud 74c on plate 31 is extended behind plate 70 to spindle film guide 53 on plate 31. A spring 76 on stud 74c biases guide 53 for turning in clockwise direction. An additional stud 77 on plate 70 limits the clockwise turning of guide 53 by spring 76 and causes turning of the guide in counterclockwise direction when plate 31 and with it assembly 60 are moved from the position of FIG. 4 into the position of FIG. 5, as will be more fully described hereinafter in connection with the description of the "Operation" of the projector.

Upper loop setter 54 mounted on plate 31 is in the form of a two-arm lever spindled on a post 81 on plate 31. One arm of loop setter 54 mounts a film loop guiding and shaping member 82. Loop setting lever 43 comprises an arm 84 spindled on a post 85 secured on plate 30 and mounting a bracket 86. The arm defines a cam surface 87 and a nose 88. A spring 89 attached to the bracket biases lever 43 in clockwise direction. Cam 87 cooperates with stud 72 on plate 70 and nose 88 cooperates with the second arm 83 of loop setter 54, as will be more fully explained hereinafter.

All the components shown in FIGS. 4 and 5 are disposed above the optical center axis 300 of the projector.

Figure 6:
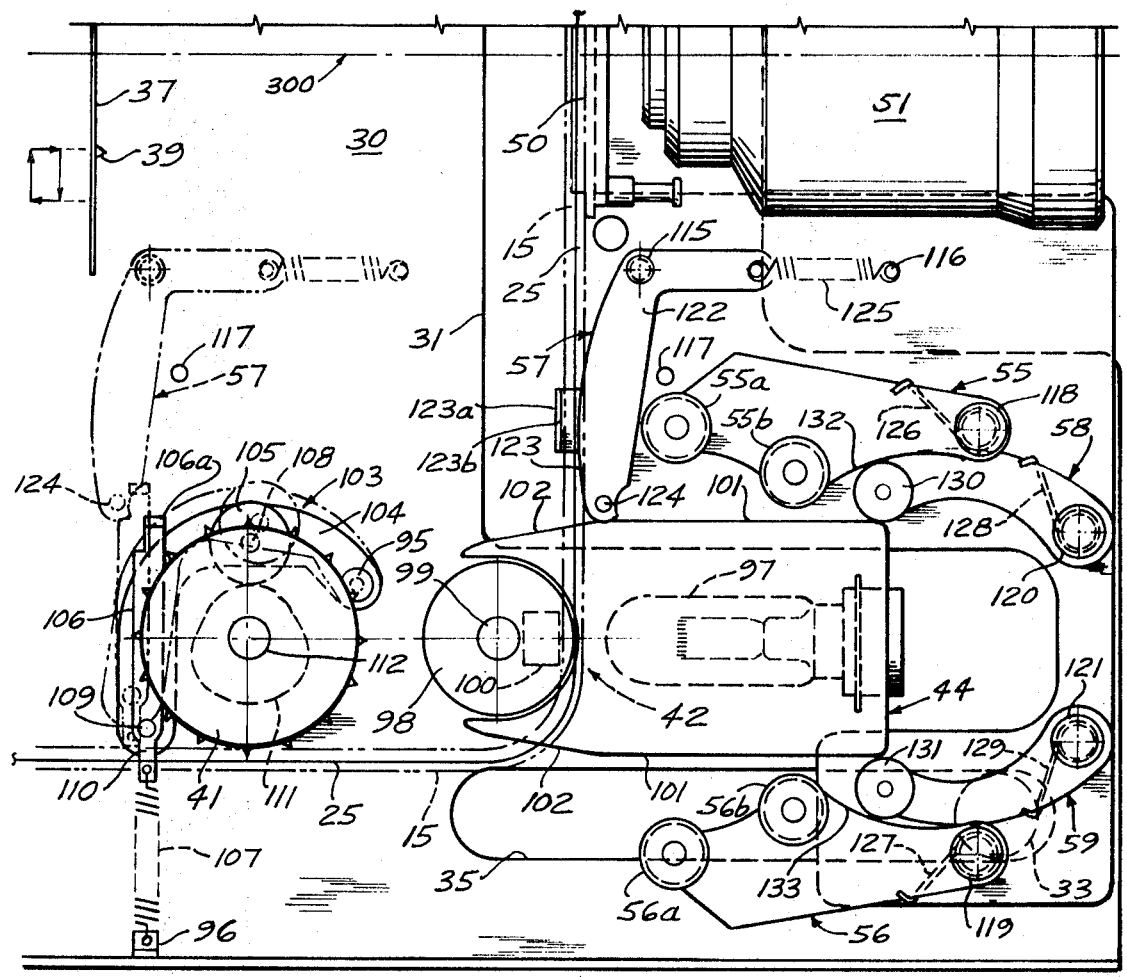
FIG. 6 is a detailed elevational view of the part of the mechanism below the optical center axis of the projector, the mechanism being shown in its nonoperating or loading position.
Figure 7:
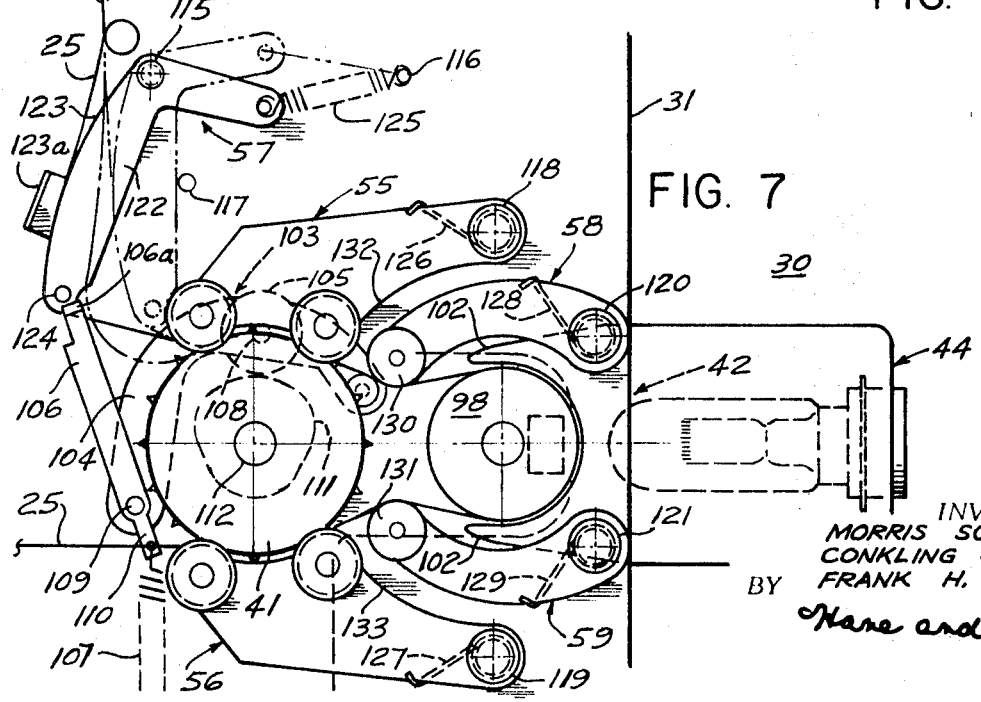
FIG. 7 is a view similar to FIG. 6, but showing the mechanism in its operating position.

Referring now to FIGS. 6 and 7, all the components shown in these figures are mounted below the optical center axis. Baseplate 30 mounts, as stated before, the sound-scanning assembly 42, the double-cam plate 44, a post 95 and a bracket 96. Scanning assembly 42 comprises an exciter lamp 97, a sound-scanning capstan 98 spindled by a post 99, and a photocell 100. The functional optical system between the exciter and the photocell is omitted for clarity of illustration. It may only be mentioned that the light beam from the exciter to the photocell traverses the sound track on film 25. For this purpose, the width of the capstan is such that the capstan will not obstruct the sound track.

Cam plate 44 defines camming surfaces 101 and 102. Post 95 spindles a lower loop setting actuating member 103 comprising an arm 104, a cam follower 105, a jack 106 and a spring 107. The cam follower is spindled by a post 108 fixed to arm 104. The jack spindled at post 109 also fixed to arm 104 has an extension 110 to which one end of a spring 107 is attached; the other end of the spring is secured to bracket 96 on plate 30. Cam follower 105 cooperates with cam 111 pinned to a shaft 112. Spring 107 biases actuating member 103 counterclockwise and by means of extension 1110 also orients jack 106 rotationally on post 109. Jack 106 performs a substantially back and forth reciprocating movement via cam follower 105 and arm 104 when cam 111 is rotated for a purpose which will be more fully explained hereinafter.

The lower part of plate 31 as shown in FIGS. 6 and 7 mounts posts 115, 116, 117, 118, 119, 120 and 121. Lower loop setter 57 is spindled on post 115. The loop setter comprises a crank arm 122 defining a film-guiding surface 123. This surface mounts a film guide 123a which preferably has a flange 123b. This film guide is the only component which protrudes into slot 15, as is clearly shown in FIG. 6. It serves as a backstop for film 25 when the same is dropped into the slot to prevent the film from falling into the slot too deeply and out of the reach of the afore and hereinafter described components of the mechanism.

The afore referred to crank arm 122 also mounts a post 124. The other arm of the crank is attached to one end of a spring 125, the other end of which is secured to post 116. The spring is a light spring and exerts upon the crank a slight counterclockwise bias which is limited by post 117.

Film guides 55 and 56 include rollers 55a, 55b and 56a, 56b respectively, and are spindled on posts 118 and 119. The guides are biased toward each other by springs 126 and 127 respectively. Idler members 58 and 59 mount rollers 130 and 131 respectively, and are spindled on posts 120 and 121 respectively. The idlers are biased toward each other by springs 128 and 129 respectively. Rollers 130 and 131 also act as cam followers to coact with cams 101 and 102 of cam plate 44. Moreover, edges of idler roller arms 58 and 59 engage edges 132 and 133 respectively, of guides 55 and 56 respectively, to effect outward turning of the guides with reference to cam plate 44.

Figure 8:
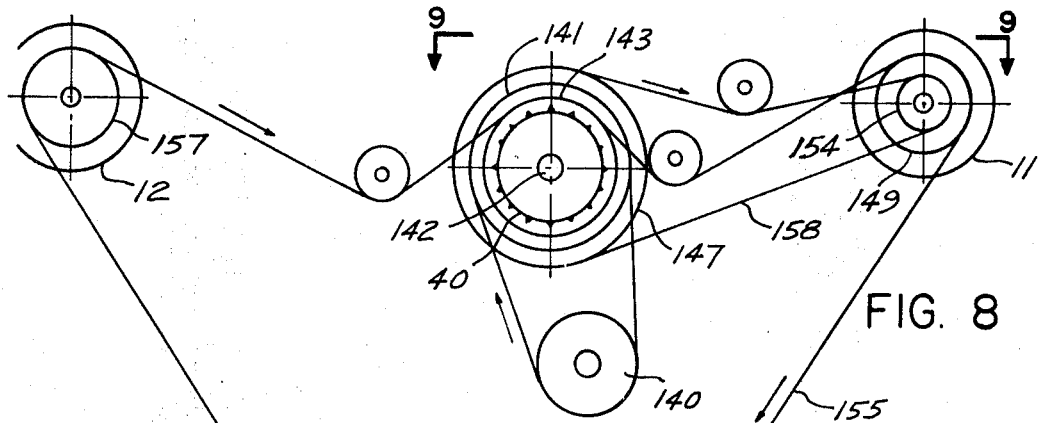
FIG. 8 is a diagrammatic elevational view of the belt drives of the mechanism.
Figures 9, 10:
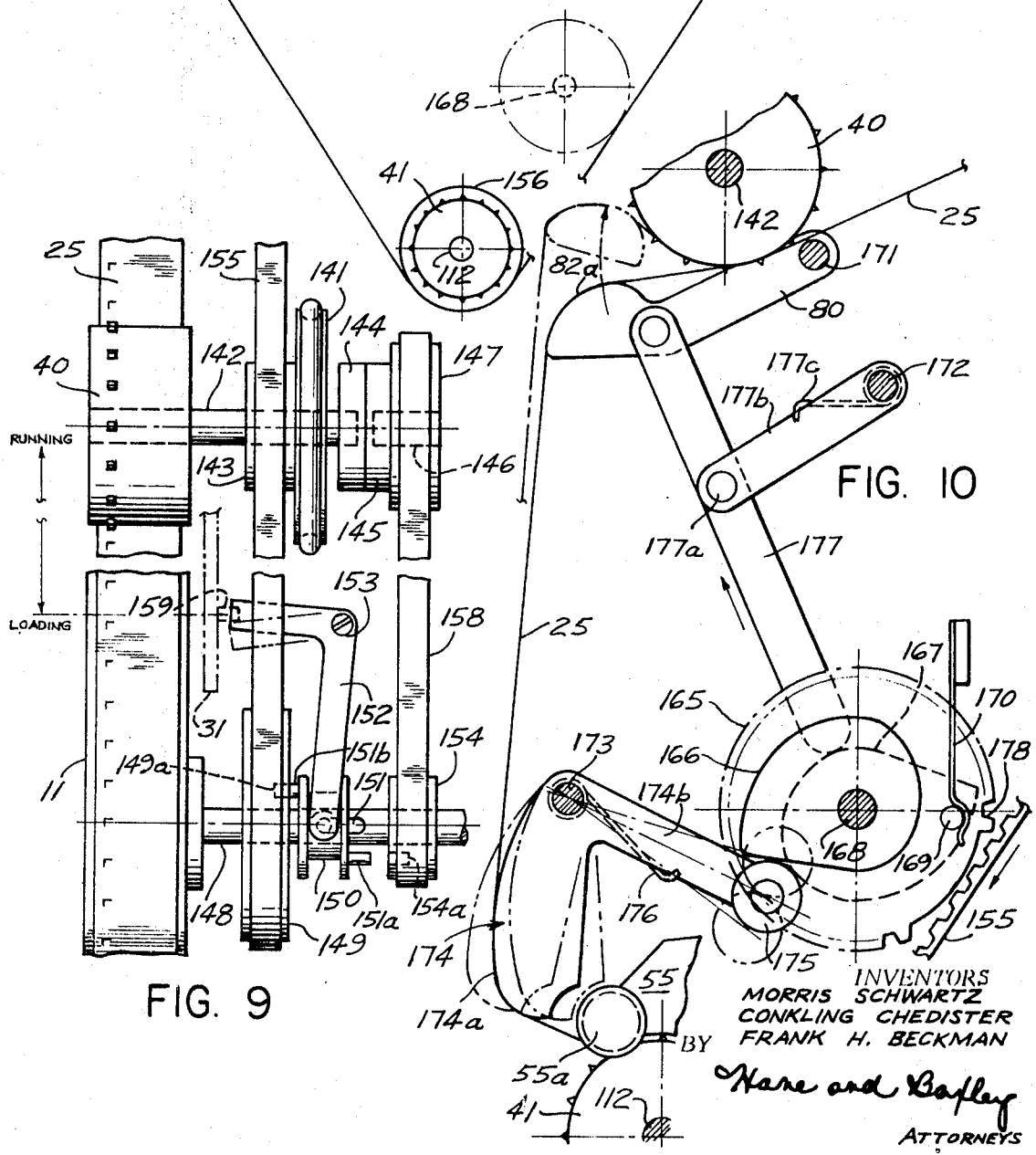
FIG. 9 is a plan view of FIG. 8 taken on line 9—9 thereof and also showing part of the rewind assembly of the projector.
FIG. 10 is a fragmentary elevational view of a modification of the loop-setting assembly of the mechanism.

Referring now to FIGS. 8 and 9, a motor 140 of the projector drives via a sheave 141 and a shaft 142, a belt gear 143. Shaft 142 also seats upper sprocket 40 and a clutch half 144. The other clutch half 145 is mounted on a shaft 146, secured to or constituting part of a belt gear 147 also on shaft 146. The two clutch halves are out of engagement when clutch half 144 is rotating in clockwise direction.

A shaft 148 which drives supply reel 11 (see FIG. 9) is pinned to a belt gear 149. The shaft also drives a clutch 150 which is lengthwise movable on the shaft by means of a spline 151. The axial position of the clutch is controlled by a crank 152 spindled on post 153 on plate 30. Shaft 148 further mounts a belt gear 154 freely rotatable on the shaft. Belt gears 149 and 154 have holes 149a and 154a respectively, as shown, to receive clutch pins 151a and 151b respectively.

A positive drive belt 155, such as a toothed belt, is guided over gears 143, 149, 156 and 157. A second belt 158, also a positive drive belt, drives gears 147 and 154. Crank 152 terminates at a point at which it is engageable with post 159 on plate 31. As shown in FIG. 9, with plate 31 in the position for loading, that is, in its nonoperating position, crank 152 will occupy the dotted line position in which clutch pin 151b is disengaged from gear 149 and clutch pin 151a is engaged with gear 154.

OPERATION OF THE PROJECTOR

Threading of film 25 is effected as follows:

The threading operation basically comprises two steps. As previously indicated, the first stop is to load the projector by withdrawing film from the supply reel and inserting the film into slot 15 and guiding the film over guide rolls 18 and 21.

The second step is to move lever 16 from its right-hand stop position 17a to its left-hand stop position 17b. This step requires a depression of the lever so that the same is clear of the recess at stop 17a. Such depression permits movement of the lever along slot 17 toward the left and into the stop position 17b in which the lever is temporarily manually held in its depressed position.

Depression of lever 16 while still in the position 17a causes a downward displacement of plate 70 to which the lever is fixed and thus also of stud 77. This movement of the stud rotates film guide 53 from its closed position into an open position in which its is retained when and while the lever is depressed. The depression of the lever also clears the same of bar 45 so that plate 31 and all the components supported thereon can be freely moved toward the left. Such movement of the plate 31 toward the left effects the threading operation as will now be more fully explained.

As shown in FIG. 4, film 25 when inserted into slot 15 bears against guide 50 on plate 31 and is thus carried along with the guide. As plate 31 is moving toward the left, the loop-forming movement of bearing and shaping member 82 is initiated by stud 72 meeting cam 87 secured to baseplate 30. The stud slides along the camming surfaces of the cam, thereby causing a clockwise rotation of upper loop setting lever 43. This rotation causes nose 88 to cam upper loop setter 54 about its post 81 thereby turning member 82 upwardly which, in turn, pulls film 25 from the supply reel thus forming the upper loop as indicated by an arrow in FIG. 5. Film 25 is now resting against upper sprocket 40 also mounted on plate 30, through not necessarily engaged with the teeth of the sprocket.

Lever 16 is now released and as a result it moves from the full line position shown in FIG. 5 into its dash-dotted position in which it locks itself in the recess at the position 17b. The threading operation is now completed as far as action by the operator is concerned.

Plate 70 moves upwardly when the lever is released and as a result stud 72 releases lever 43. Loop setter 54 now drops down, aided by spring 75. Guide 53 is also released due to the upward movement of stud 72, together with plate 70 and moves into the position shown in FIG. 2. The guide now returns into its closed position thereby urging the film into engagement with the teeth of sprocket 40 as soon as the projector is started if the film did not engage the sprocket teeth before by the initial action of loop setter 54.

Upon completion of the movement of plate 31 toward the left film guide 50 has reached its position coacting with stationary film guide 37, as is shown in FIG. 5, so that the film is now held in the projection slot formed by guides 37 and 50.

The completed upper loop is clearly shown in FIG. 2.

The movement of plate 31 toward the left has also moved the focusing assembly 52 and the projector lens drum 51 into the position of FIG. 3 so that the projection lens can be focused by pressing in knob 13 as previously described.

Describing now the operations which occur in the part of the mechanism below the optical center axis 300, reference is made to FIGS. 6 and 7. As shown in these figures, the film is trapped by guide 123a on the lower loop setter 57 and is taken along as plate 31 moves toward the left. As a result the film is forced to wrap itself about capstan 98 by the action of rollers 130 and 131 on filter rollers 58 and 59 respectively. Rollers 130 and 131, and hence the filter rollers are spread apart while riding along the camming surfaces 101 and 102 on double cam plate 44 on baseplate 30. When rollers 130 and 131 leave the double cam they move toward each other and into the position of FIG. 6. Moreover, the movement of rollers 58 and 59 toward the left together with plate 31 forces the film into engagement with lower sprocket 41 as shown in FIG. 7.

The film is now so positioned that it can be transported in the conventional manner by the movements of claw 39 (see FIG. 6) when the projector motor is started.

Lower loop setter 57 which also has moved during the displacement of plate 31 from the position of FIG. 6 into the position of FIG. 7, occupies the position shown in dash-dotted lines in FIG. 6 when and while projection proceeds in normal fashion. It may be mentioned in this connection that the distance between the projector slot formed by film guides 37 and 50 and sound capstan 98 is selected to achieve synchronization between pictures and sound in a conventional manner.

As described before jack 106 continuously reciprocates during normal operation of the projector due to the coaction between cam 111 and roller 105 on arm 104 to which the jack is pinned at post 109. During such movement, a bracket 106a on the jack will miss pin 124 on arm 122 of loop setter 57, that is, the jack will idle.

Assuming now the projector is started or that for some reason such as a fault in the film due to torn sprocket holes, the film is not smoothly transported and thus the length of the film between the projection slot and sprocket 41 tightens, and that the film portion between the projection gate and upper sprocket 40 becomes bunched causing an enlargement of the upper loop, the film portion adjacent to arm 122 presses against the arm causing the same to turn in counterclockwise direction. In such turned position, which is shown in FIG. 7 in dash-dotted lines, bracket 168 on arm 106 becomes engaged with pin 124 during its next reciprocating movement, thereby swinging arm 122 into the full line position of FIG. 7. As a result of such movement, arm 122 pulls film down from above the projection slot thereby restoring the lower loop and reducing the upper loop to its normal size. Moreover, loop setter 57 is released to return to its normal position, as shown in FIG. 6, thus freeing its pin 124 from engagement with bracket 106a of jack 106.

Referring now to FIGS. 8 and 9, during normal running of the projector belt 155 rotates both sprockets 40 and 41 and also both reels 11 and 12, either forward or in reverse. To effect rewind, the projector motor is stopped and operating lever 16 (FIG. 1) is returned to its loading position at 17a and the film is lifted out of slot 15. Pin 159, moving jointly with plate 131 (see FIG. 9), swings crank 152 so that crank pin 151b is detached from hole 149a of clutch 149 and crank pin 151a engages hole 154a of clutch 154. As a result, upon restarting the projector motor supply reel 11 instead of takeup wheel 12 is now driven by clutch 145 and belt 158.

FIG. 10 shows an assembly including coacting cams, links and cranks which are automatically activated to set both loops when the lower loop shortens for any reason, such as a slowup of the film transport, caused for instance by torn sprocket holes. The assembly of FIG. 10 is driven by toothed belt 155.

More specifically, a belt gear 165, a cam 166 and a cam 167 are pinned to a rotary shaft 168. The general location of the assembly of FIG. 10 is indicated in FIG. 8 by dotted lines.

The teeth of gear 165 are engageable with belt 155. In the inactive position of the assembly the gear is out of driving engagement with belt 155 due to the omission of, say, four teeth. Moreover, a post 169 on gear 165 is slightly held in a springy detent 170.

The assembly further comprises posts 171, 172 and 173, all mounted on plate 31 for movement in unison with the same so that the posts occupy in the operating or left position of plate 31 definite and stationary positions with reference to sprocket shafts 142 and 112, both mounted on baseplate 30 and also relative to shaft 168 which is supported by plate 31.

A crank arm 174 pinned to post 173 has on one arm a film guiding surface 174a similar to surface 123 on arm 122 of loop setter 57 (see FIG. 5). The arm 174b of the crank mounts a cam follower 175 riding on cam 166. A spring 176 biases the crank in counterclockwise direction.

Cam 167 on shaft 168 has riding thereon one arm of a two-arm link 177 pinned at 177a to a link 177b pivoted to post 172. The other arm of link 177 is hinged to loop shaping member 82a which, in turn, is pinned to post 171. A light spring 177c restrains the linkage formed by links 177 and 177b to prevent rattling thereof.

OPERATION OF THE ASSEMBLY OF FIG. 10

Assuming now that the film should tighten between sprockets 40 and 41 due to faulty film, as previously described, the film will press against crank 174 which, in turn, will cause its cam follower 175 to exert pressure against cam 166. The resulting torque on cam 166 is sufficient to force post 169 out of engagement with detent 170 and turn the cam. The tooth 178 of gear 165 will now engage moving belt 155. As a result, cams 166 and 167 will continue to rotate. Such rotation forces crank 174 into the dash-dotted position and will also cause upper loop shaping member 82a to move from the full line position into the dash-dotted position by the action of link 177. As a result, both the upper loop and the lower loop are reset.

When gear 165 is turned through an angle such that pin 169 reenters detent 170, there is no longer pressure on cam follower 175. Accordingly, the crank 174 will return into its full line position as will also loop-shaping member 82a so that the entire assembly is now returned to its inactive position shown in FIG. 10 in full lines.

FIGS. 11 and 12 show a modification of the loop setting assembly of the threading mechanism which is highly sensitive in response during operation of the projector and also has more positive detent means than the loop-setting assemblies previously described.

The assembly comprises for control of the lower loop a roller 178 mounted on a lever 179 pinned to a shaft 180 which, in turn, is pinned to a lever 181. Shaft 180 is rotatable in a bearing housed in movable plate 31 and positions lever 181 to bear against a pin 182 on a wheel 183 to rotate the same. Wheel 183 has in its peripheral wall two diametrically opposite concave recesses 187 for a purpose which will be more fully explained hereinafter, and coacts with the preferably rubber lined or otherwise cushioned periphery of an idler roll 184, swingably supported on a link 184a pivotal about a pin 184b on plate 31. The idler roll is engageable with a flange 185 on belt gear 156 but is normally held out of engagement with this flange by the action of a spring 188. As is shown in FIG. 8, the belt gear is seated on shaft 112 also seating the lower sprocket gear 41.

Rotation of wheel 183 into an angular position in which a nonrecessed portion of the peripheral wall of the wheel engages wheel 184, causes a depression of wheel 184 into driving engagement with flange 185 of gear 156 which, in turn, is driven by belt 155, thereby establishing a transmission train between gear 156 and wheel 183.

When the projector is normally operating, the lower loop formed by film 25 is about as indicated in full lines in FIG. 11 and lever 179 occupies the full line position into which it is biased by a spring 179a acting against a pin 179b. If now the film tightens due to torn sprocket holes as previously explained, the film presses against roller 178 on lever 179 and turns the lever counterclockwise and depresses lever 181 against pin 182. As a result, wheel 183 is turned from the angular position of FIG. 11 in which one of its recesses 187 is in registry with the peripheral wall of idler roll 184 into and beyond the position of FIG. 12 in which the nonrecessed peripheral wall of wheel 183 engages the periphery of roll 181 thereby pressing this roll downwardly against the action of spring 188.

As a result, wheel 183 is now driven by gear 156 via the aforedescribed transmission train until a second pin 186 on wheel 183 engages arm 181 of lever 179 thereby turning the lever in clockwise direction and into the dash-dotted position of FIG. 11. As a result, the film is pulled down from the area above the projection slot and the lower loop is restored by roller 178 as it is shown in dotted lines in FIG. 11.

As wheel 183 continues its rotation it releases arm 181 and thus roller 178. When the wheel reaches the position in which its second recess 187 reengages idler roll 184, this roller is disengaged by spring 188 from gear flange 185. The assembly now comes to a stop and lower loop setter 178, 179, 181 returns into the full line position.

Referring to FIGS. 13 and 14, a novel means is shown for stopping a film during projection, manually or automatically. The frame at the selected stopping point is in register with the optical system and is illuminated.

In the conventional part of the means, film 25 positioned in a plane normal to the drawing is engaged in a sprocket hole 25A by a claw 190 dependent upon the position of an axial cam 191 in contact with a cam follower 192 mounted on a claw arm 193. Arm 193 is biased toward cam 191 by a spring 194 on a shouldered pin 195 passing through the projector frame. For transport of the film, the movement of arm 193 normal to the drawing is obtained, by way of example, by a scotch yoke 196 functioning as a cam follower for a radial cam 197. As is evident, arm 193 must move in two planes. For this purpose, pin 195 is free to swivel as is a bearing surface 193A on arm 193. A shutter 198 and cams 191 and 197 are pinned with a drive pulley 199 to a shaft 200 which is journaled in bearings 201 and 202. This completes the description of the prior art for clarity of the following.

Bearings 201 and 202 allow axial movement of shaft 200 under the influence of a solenoid 203 acting through a crank arm 204 to move the shaft against a spring 205.

Also pinned to shaft 200 is a cam 206 operating an electrical switch 207, a plate 208A having a groove 209A and a friction disc 210A.

Slidable and rotatable on shaft 200 is a sleeve 211 which has pinned to it a worm gear 212, a cam 213 operating an electrical switch 214, a plate 208B having a tongue 209B and a friction disc 210B. Axial movement of sleeve 211 is adjustable and limited by the positioning of a fork 215 between a cam 213 and a plate 208B. The fork is mounted on a lengthwise adjustable bracket 215A. A worm gear 212 is engaged by a worm wheel 216 on a shaft 217 which should be visualized as being connected to a belt between upper and lower sprockets 40 and 41 respectively. It is to be noted that these sprockets, in this illustration, are not connected by belt 155 to the motor drive 140.

Inspection of the mechanics will show that the motor belt driving pulley 199 will cause operation of the film transport, switches 207 and 214, the upper and lower sprockets and both reels 11 and 12, but on energizing solenoid 203 the pulley will not operate the sprockets and reels due to the resulting displacement of shaft 200. Also, on energizing, claw 190 will move from an operating range "X" to a nonoperating range "Y" and switch 214 will cease operating. The assembly on sleeve 211, having practically no flywheel momentum, will act as a fast brake (due to the total friction in the belt drive bearings etc.) when groove 209A leaves tongue 209B and friction discs 210A, 210B separate. This brake makes it possible to have a small tolerance in the variation of time lapse between energizing and claw withdrawal. On deenergizing solenoid 203 spring 205 moves the shaft toward the left whereby disc 210A first contacts disc 210B lightly to get sleeve 211 started. Sleeve 208A will then slip around until groove 209A engages tongue 209B. Infrequently, when tongue and groove match on deenergizing, sleeve 211 will be started abruptly.

Finally, it is noted that cams 213, 206, 191 and 197 operate in a fixed radial angularity when solenoid 203 is deenergized.

In order to see the film frame in register, the claw must be withdrawn to area "Y" during its retrace normal to the drawing. To this end, referring to FIG. 15, an electrical circuit employing a relay 218, having contacts 219 and 220 is used in cooperation with cam 213. Cam 213 shows a raised sector which closes contact 214 during the claw retrace. Closing a pushbutton switch 260 to a source 261 will energize relay 218 at the instant of claw retrace. Contact 220 will then energize solenoid 203 and claw arm 193 will move into area "Y." Contact 219 seals in relay 218 so that the solenoid energization is independent of the position of cam 213 when it is stopped.

When it is desired, manually or automatically to restart the film, the circuit at switch 260 is opened. However, without cam 206 (that is with contact 207 shorted) the returning claw may engage the film at any point in its forward traverse and thus upon missing the sprocket hole would drag the film and shorten the upper loop. To avoid such action, cam 206 shows a swell area during the claw retrace to ensure deenergization during this time independent of the opening of switch 260.

Switch 260 may be a time delay switch or a delay network settable for selected stop and release periods to control the stoppage of a selected frame in the picture gate. The use of such automatic variable timing networks, which are well known in the art, makes projectors equipped with the mechanism and circuitry of FIGS. 13, 14 and 15 suitable for use as stop motion projectors or motion analyzers.

Figure 16:
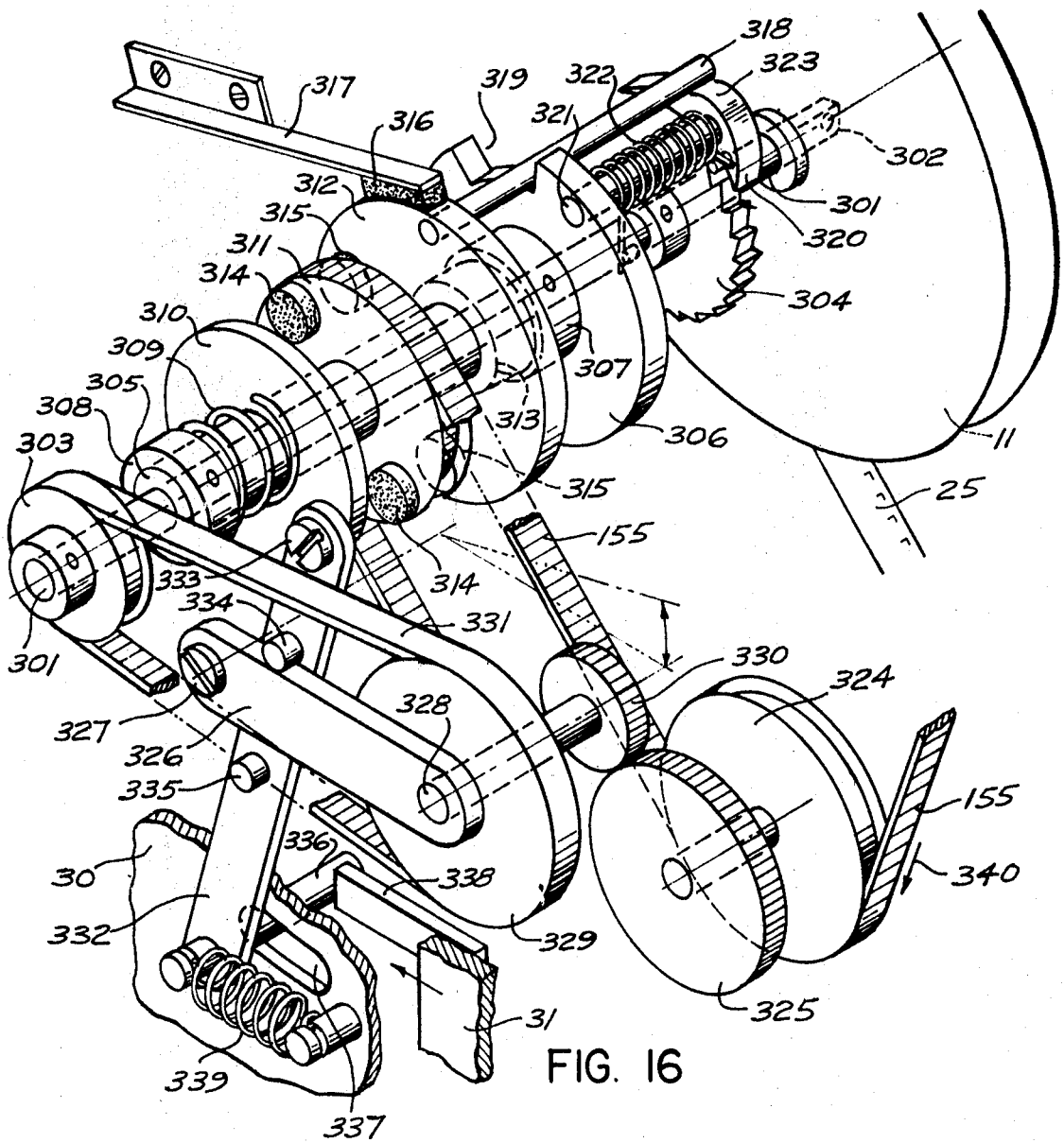
FIG. 16 is a perspective view, as seen from the rear, of a rewind assembly for fast rewind.

Referring now to FIG. 16, this figure shows an assembly by means of which film 25 can be quickly and automatically rewound on supply reel 11. Such fast rewind is effected by performing the following steps:
 a. Lever 16 (FIG. 1) is moved into the position in which plate 31 is in the loading position.
 b. Film 25 is lifted out of slot 15.
 c. Motor is put in reverse mode.

An electric interlock permits normal speed in forward or reverse but prevents fast rewind unless step (a) is first carried out as will be described in connection with FIG. 17.

Supply or storage reel 11 is fixed at one end of a shaft 301 by a conventional reel holder and lock 302. If reel 11 is mounted on an arm such as is shown in FIG. 1, lock 302 may be visualized as a belt gear and belt assembly driving another gear on the arm.

A belt gear 303 is pinned to other end of shaft 301 and a ratchet 304 is pinned to the shaft close to reel 11. Spindled on shaft 301, an elongate hub 305 has pinned to it on one end a disc 306 by means of a collar 307 and at the other end of the hub a collar 308 is pinned. Between the collars, hub 305 presents a smooth bearing surface carrying the following freely rotatable members: a spring 309, a disc 310, a belt gear 311, another disc 312 and a thrust bearing 313. Disc 310, gear 311 and disc 312 are friction members in that one side of disc 310 is in frictional contact with two buttons 314 on one side of gear 311 and one side of disc 312 is in frictional contact with two buttons 315 on the opposite side of gear 311, the degree of frictional drag being controlled by the choice of spring 309.

For clarity in the figure, the discs 310, 312 and gear 311 are shown out of engagement. Further, the rim of disc 312 is frictionally engaged by a pressure pad 316 on a springy arm 317. The thrust of spring 309 terminates on one end at collar 307 on disc 306 and on the other end at collar 308.

Disc 312 carries a pin 318 which passes through a slot 319 to cooperate with a pawl 320 spindled on a pin 321 fixed in disc 306. A spring 322 biases pawl 320 into engagement with ratchet 304. Pawl 320 has a cam surface 323 such that the relative position of discs 312 and 306 determines the engagement of the pawl with ratchet 304. In the figure, the pawl is shown to be disengaged. Thus, upon opposite displacement of discs 312 and 306 into an angular position in which pin 318 is at the far end of the slot 319, pawl 320 will engage the ratchet. Spring 321 is very soft compared to the frictional torque at pad 316, that is, the torque of pad 316 is larger than frictional torque of the two pads 315. Gear 311 is engaged by toothed belt 155 which, besides driving the film transport sprockets and the shutter, passes around a belt gear 324 rotating jointly with a spur gear 325.

An arm 326 spindled on a post 327 carries at its free end a shaft 328 which spindles a belt gear 329 rotating with a spur gear 330. Arm 326 swings gear 330 into or out of engagement with gear 325 as indicated by an arrow at the axis of shaft 328. A toothed belt 331 connects belt gears 329 and 303.

Another arm 332 spindled at pin 333 has two pins 334, 335 straddling arm 326. Thus, clockwise movement of arm 332 causes gear 330 to engage gear 325. At the lower end of arm 332, a pin 336 extends through a slot 337 in baseplate 30 to cooperate with a bar 338 attached to movable plate 31. Movement of plate 31 into the loading position (as shown) causes pin 334 to swing gear 330 into engagement with gear 325 and conversely movement of plate 31 into the operational position causes pin 335 to swing the gear 330 out of engagement with gear 325. Arm 332 is biased counterclockwise by a spring 339.

OPERATION OF THE FAST REWIND ASSEMBLY

In normal forward operation, plate 31 is in the operational position and belt 155 is driven in the direction indicated by an arrow 340. Accordingly, disc 311 rotating counterclockwise, frictionally turns disc 312 which, in turn, is retarded by friction pad 316. This causes pin 318 to bear against the near wall of slot 319 in disc 306 which is being rotated by friction buttons 314, disc 310, spring 309, collar 308 and hub 305. At this position of pin 318 in slot 319, the pin cams pawl 323 out of ratchet 304. Since plate 31 is in the operational position, shaft 301 is free and film 25 is pulled off reel 11 as demanded by the sprocket drive. In other words, the assembly supported on hub 305 is free wheeling on shaft 301.

In normal reverse operation, belt 155 is driven in the direction opposite to arrow 340 and plate 31 is retained in the operational position. Accordingly, gear 311 is driven clockwise and pin 308 is thus moved to the far end of slot 319 so that pawl 320 is now in engagement with ratchet 304. Hence, the assembly supported on hub 305 rotates with shaft 301 and film 25 is rewound on supply reel 11. The gradually widening gap of the differential speed between the film drive and the reel drive due to the gradually increasing circumference of the film rewound upon the reel 11 causes slippage of friction buttons 315 relative to disc 312. Spring 309 abutting against collar 308 now supplies the pressure necessary to pull film onto reel 11 without damaging the sprocket holes of the film.

To effect fast rewind, the projector motor must be stopped and plate 31 be moved into its loading position. FIG. 16 shows condition of the assembly when the projector motor is stopped in normal forward operation and plate 31 is moved into the loading position but before the motor is started in reverse.

When now the motor is started, belt 155 again turns disc 311 clockwise, that is, in opposition to arrow 340. Drag of friction pad 316 on disc 312 now causes pin 318 to move to the rear of slot 316 and pawl 320 therefore engages ratchet 304. Gear 330 has been moved into engagement with gear 325 by the displacement of plate 31 and the resulting pivoting of arm 332 as previously described. Gear 325 now drives gear 330 at a stepped-up speed due to the ratio between the gears. Gear 330, in turn, through large gear 329, belt 331 and smaller gear 303 drives shaft 301 at a yet higher speed. Thus, ratchet 304 overruns pawl 320 as both turn clockwise during fast rewind, the ratchet teeth merely clicking past the pawl. Hence, the film is rewound with a speed determined by the gear ratio.

Figure 17:
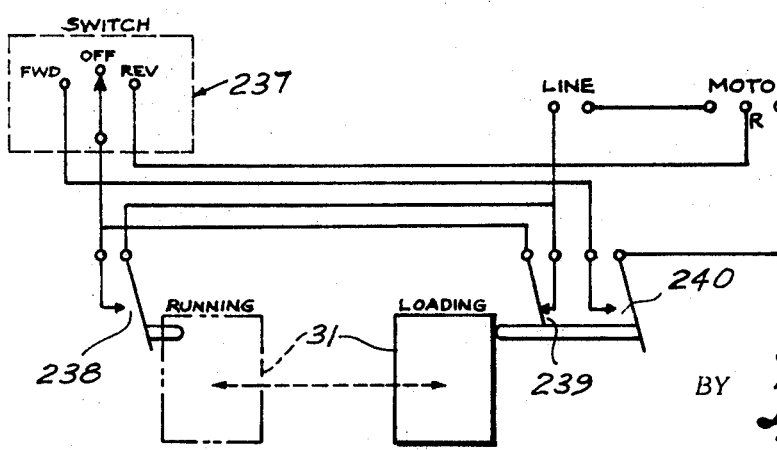
FIG. 17 is a circuit diagram preventing operation of the projector motor for forward drive when the mechanism is set for loading the film.

Suitable circuitry for the electric interlock referred to in connection with the description of FIG. 16 is shown in FIG. 17. This figure shows an electric safety control which prevents operation of the motor in forward drive when movable plate 31 is in the loading position.

As shown, plate 31 in the loading position closes a switch 239 and opens a switch 240 which, in turn, opens the forward energizing circuit for the motor through a control switch 237 thereby rendering inoperative the forward position of the control switch but permitting the closing of the energizing circuit for reverse drive of the motor via switch 239. When plate 31 is placed in the operational or running position a switch 238 and switch 240 are closed but switch 239 is open so that the motor can be started for forward drive.

Switches 239 and 238 are arranged to be opened when and while plate 31 is between its loading position and its operational position to prevent operation of the film drive sprockets as such operation may damage the film. When plate 31 has reached either the loading position or the operational position, switches 239 and 238 are closed.

What is claimed is:

1. In a motion picture film projected a film-threading mechanism comprising in combination:
   a casing including in one of its outer walls a continuous slot;
   a baseplate stationarily mounted in the casing parallel to and behind said slotted wall;
   a front film guide including a film gate mounted on the baseplate on one side of the slot adjacent to part of the length thereof;
   an upper and lower sprocket rotatably mounted on the baseplate and disposed on the opposite side of said slot;
   a movable plate displaceable within the casing disposed between said plate and said wall parallel thereto;
   a rear film guide including a film gate, film-threading means and loop-setting means mounted on the movable plate,
   said movable plate being displaceable on the opposite side of the slot between a loading position for inserting into the slot a length of the film to be threaded and an operating position in which said film guides define therebetween a projection slot and said threading means and loop-setting means coact with the sprockets and film in the slot to thread the film upon the sprockets and to form an upper and a lower loop in the length of the film between the two sprockets;
   an assembly for stopping transport of the film at a selected frame, said stop assembly including:
   film transport means for transporting film threaded upon said sprockets, said transport means being movable into and out of transport engagement with the film;
   a rotatable control shaft slidable into either one of two axial positions;
   a solenoid means coacting with said shaft to control the axial position thereof in accordance with the state of energization of the solenoid means;
   transmission means on the shaft releasably coupled to the sprockets for rotating the same;
   a driving means for rotating the sprocket transmission means, said driving means being coupled to the shaft in one axial position thereof and being uncoupled from the shaft in the other axial position thereof, and for driving the film transport means in either axial position of the shaft;
   clutch means for coupling the sprocket transmission means to the shaft, said clutch means coupling the transmission means in said one axial position and uncoupling said transmission means in said other axial position of the shaft;
   film transport control means moving the transport means into engagement with the film in said one axial position of the shaft and moving the transport means out of such engagement in said other axial position; and
   control circuit means including switches controlling an energization circuit for the solenoid means and cam means on the shaft controlling said switches in accordance with the angular position of the shaft, operation of said control circuit means activating said solenoid means to displace the shaft from said one axial position to said other axial position thereby moving the film transport means out of engagement with the film and uncoupling the clutch means thus stopping driving of the sprockets via the sprocket transmission means.

2. The projector according to claim 1 wherein said clutch means comprise a first clutch member including a sleeve axially slidable on the shaft and a second clutch member secured to the shaft for rotation in unison therewith, displacement of the shaft relative to the sleeve by activation of the solenoid means moving said clutch members out of clutching engagement.

3. The projector according to claim 2 wherein one of said clutch members comprises a claw member and the other a cutout positively engageable with the claw and each of said clutch members comprises a friction disc, said discs engaging each other with a frictional grip upon displacement of the shaft in response to a deactivation of the solenoid means to initiate rotation of the sleeve and thus of the sprockets via the transmission means therefor, said frictional grip between the discs permitting slippage of the clutch members with reference to each other into a relative angular position in which the claw engages the cutout thereby positively locking the clutch members to each other.

4. The projector according to claim 3 wherein said sprocket transmission means comprise a worm mounted on said sleeve and a gear wheel in mesh with said worm, said gear wheel being seated on a drive shaft for the sprockets.

5. In a motion picture film projector a film-threading mechanism comprising in combination:
   a casing including in one of its outer walls a continuous slot;
   a baseplate stationarily mounted in the casing behind said slotted wall and a movable plate disposed between said baseplate and said slotted wall, said wall and said plates being mutually parallel and said movable plate being displaceable on one side of the slot;
   an upper sprocket and a lower sprocket rotatably mounted on the baseplate on the opposite side of the slot;
   a front film guide fixedly mounted on the base plate on said opposite side of the slot and a rear film guide mounted on the movable plate coacting with the front guide to define a projection slot therewith;
   threading means for threading film inserted into the slot upon the upper and the lower sprockets and loop setting means for forming an upper loop and a lower loop in the film portion extending between the sprockets, said threading means and said loop setting means being mounted on the baseplate and the movable plate;
   actuating means operable to effect film threading and loop forming respectively by said threading means and said loop-setting means, displacement of said movable plate from a loading position for inserting into the slot film to be threaded into an operating position activating said actuating means for effecting film threading and loop forming,
   said loop-setting means including an upper loop-setting assembly and a lower loop-setting assembly, linkage means coupling said assemblies for activating the upper assembly in response to an activation of the lower assembly, said lower loop-setting assembly including a loop-shaping member mounted on said movable plate pivotal between an inactive position and a loop-shaping active position; and an actuating assembly for activating said loop-setting assemblies, said actuating assembly including a driving means controlled by said lower loop-shaping member and controlling the operation of the upper loop-setting assembly via said linkage means, engagement of the film portion adjacent to lower loop-shaping member by the same due to tightening of said film portion causing pivoting of said member into its loop-shaping active position, said pivotal movement also activating the driving means, said driving means in turn activating the upper loop setting assembly for setting the upper loop.

6. The projector according to claim 5 wherein said rear film guide upon displacement of the movable plate toward the front film guide engages the film portion extending between the upper and the lower sprocket and pulls said film portion toward the front guide.

7. The projector according to claim 5 wherein said threading means comprise:

an upper sprocket threading assembly, upper guiding means mounted on the movable plate pivotal between an inactive position clear of the upper sprocket and an active position holding a part of the film portion pulled forward by the rear film guide against the upper sprocket for threading engagement therewith; and wherein said actuating means include an upper actuating assembly controlling said upper guiding means when and while the movable plate is being displaced toward the operating position to pivot said guiding means into the active position and to release the same upon placement of the movable plate in the operating position.

8. The projector according to claim 7 wherein said actuating means further comprise a support plate supported on the movable plate displaceable relative thereto and mounting a stud engaging said upper guide means in one position of displacement of the support plate to pivot said upper guide means into the active position and releasing said upper guide means in another position of displacement of the support plate, biasing means biasing said support plate into said other position of displacement, and an actuating lever secured to the support plate and operable to depress the same into said one position and to move the support plate jointly with the movable plate between the loading position and the operating position of the movable plate.

9. The projector according to claim 5 wherein said threading means further comprise:

a lower sprocket-threading assembly, lower guiding means mounted on the movable plate pivotal between an inactive position clear of the lower sprocket and an active position holding another part of the film portion pulled forward by the rear guide against the lower sprocket for threading engagement therewith; and wherein said actuating means further include a lower actuating assembly secured to the baseplate said assembly engaging said lower guide means for pivoting the same into the active position when and while the movable plate is being displaced toward the operating position and holding the lower guide means in said active position when and while the movable plate is in the operating position.

10. The projector according to claim 5 wherein said upper loop-setting assembly also comprises a loop-shaping member mounted on the movable plate pivotal between a loop-forming active position engaging a part of the film portion pulled forward by the rear guide and an inactive position clear of said part of the film portion, and bias means biasing said member into its inactive position; and wherein said actuating means further comprise an upper loop-setting actuating assembly mounted on the baseplate in a position engaging the upper loop-shaping member when and while the movable plate is being moved toward the operating position, said engagement pivoting the upper loop-shaping member into its active position.

11. The projector according to claim 10 wherein a wall portion of said casing includes an elongate guide slot for guiding said lever while displacing said movable plate into either one of two end positions, one end position being the loading position and the other the operating position of the lever, said slot having a retaining recess at each end for releasably retaining the lever in the respective end position, manual depression of the lever in either one of said end positions freeing the lever for displacement along the guide slot, said lever when held depressed in its operating end position retaining the upper loop-shaping member in its active position and releasing said member upon release of said lever for movement into the respective recess by the action of the bias means.

12. The projector according to claim 5 wherein said actuating means further comprise a lower loop-actuating assembly including a reciprocatingly driven member, said driven member being disposed to miss said lower loop-shaping member in the inactive position thereof and to engage said shaping member in response to a displacement thereof by pressure of film upon the shaping member due to tightening of the film portion adjacent thereto, said displacement of the lower loop-shaping member causing engagement thereof with the driven member, said engagement pivoting the shaping member into its loop-shaping position.

13. The projector according to claim 5 wherein said lower loop-shaping member comprises a bellcrank pivotal about its fulcrum, one arm of said crank being engaged by said bias means and the other arm mounting a film guide, said film guide protruding into said continuous slot to support film inserted therein thereby limiting the depth of insertion of the film into the slot.

14. The projector according to claim 5 wherein said driving means comprise:

rotary cam means drivable by a drive motor in predetermined angular positions of the cam means, said linkage means and said loop-shaping member of the lower loop setting assembly including cam followers riding on the cam means for control by the angular positions thereof, the cam follower of the shaping member also controlling the angular positions of the cam means, pivoting of the loop-shaping member out of its inactive position by tightening of said film portion causing turning of the cam means into said predetermined angular positions to effect rotation thereof, said cam means while rotating through said angular positions displacing said cam followers to pivot the loop-shaping member into its loop-shaping position and activating the upper loop-setting assembly.

15. The projector according to claim 5 wherein said lower loop-setting assembly includes:

a bellcrank pivotally mounted on said movable plate, one arm of said crank having a loop-shaping surface portion, the crank being pivotal between a loop-shaping active position and an inactive position;

a drive roller supported on the baseplate rotatable about a stationary axis;

an intermediate roller supported on the movable plate movable into and out of driving engagement with the drive roller;

a control means on the movable plate controlling the position of said intermediate roller for moving the same into and out of engagement with the drive roller, said control means being controlled by the pivotal position of said crank and also controlling the pivotal position thereof; the other arm of the crank in response to a tightening of a film portion against said one arm pivoting the crank into an angular position in which the other arm of the crank activates the control means to move the intermediate roller into driving engagement with the drive roller, the resulting rotation of the intermediate roller causing pivoting of the crank into another angular position in which said one arm thereof shapes the lower loop.

16. The projector according to claim 15 wherein said control means comprise a roller having in its peripheral wall two circumferentially spaced concave recesses matching the peripheral curvature of the intermediate roller, and on one of its face walls two circumferentially spaced studs, engagement of the intermediate roller with either one of said recesses permitting rotation of the intermediate roller relative to the recessed roller and engagement with nonrecessed wall portions of the recessed roller transmitting rotation between the rollers, pivoting of the bellcrank by tightening of said film portion moving said other arm of the crank into engagement with one of said studs, said engagement rotating said recessed roller out of the angular position in which one of the recesses thereof is engaged by the intermediate roller, said rotation causing the recessed roller to move the intermediate roller into driving engagement with the drive roller thereby transmitting rotation of drive roller to the recessed roller via the intermediate roller, said rotation of the recessed roller turning the other stud thereon into engagement with said other arm of the crank, said engagement moving said one arm of the crank into the loop shaping position thereof and the recessed roller toward engagement of the intermediate roller with the other recess of the recessed roller thereby feeding the intermediate roller for rotation relative to the recessed roller, said other arm of the crank being released by said other stud prior to engagement of the intermediate roller with said other recess for return of the crank into its inactive position.

17. The projector according to claim 5 and comprising electric power drive means for forward and rewind driving of the film, and safety circuit means including switch means automatically disconnecting the power drive means for forward drive when and while said movable plate is in its loading position and further switch means disconnecting said drive means for drive of the film in either direction when and while the movable plate is in a position intermediate its loading position and its operating position.